(12) United States Patent
Ikarashi et al.

(10) Patent No.: US 11,461,395 B2
(45) Date of Patent: Oct. 4, 2022

(54) CONFIDENTIAL SORT SYSTEM AND METHOD

(71) Applicant: NIPPON TELEGRAPH AND TELEPHONE CORPORATION, Chiyoda-ku (JP)

(72) Inventors: Dai Ikarashi, Musashino (JP); Koki Hamada, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 170 days.

(21) Appl. No.: 16/652,895

(22) PCT Filed: Oct. 11, 2018

(86) PCT No.: PCT/JP2018/037897
§ 371 (c)(1),
(2) Date: Apr. 1, 2020

(87) PCT Pub. No.: WO2019/074044
PCT Pub. Date: Apr. 18, 2019

(65) Prior Publication Data
US 2020/0250228 A1   Aug. 6, 2020

(30) Foreign Application Priority Data
Oct. 13, 2017  (JP) .............................. JP2017-199210

(51) Int. Cl.
*G06F 7/24*       (2006.01)
*G06F 16/901*   (2019.01)
*H04L 9/08*      (2006.01)

(52) U.S. Cl.
CPC .............. *G06F 16/901* (2019.01); *G06F 7/24* (2013.01); *H04L 9/085* (2013.01); *H04L 2209/46* (2013.01)

(58) Field of Classification Search
CPC .................................. G06F 7/24; H04L 9/085
See application file for complete search history.

(56) References Cited

U.S. PATENT DOCUMENTS

| 2013/0182836 A1* | 7/2013 | Hamada ................ H04L 9/0891 380/28 |
| 2017/0046520 A1* | 2/2017 | Ohrimenko ........... G06F 21/602 |

OTHER PUBLICATIONS

Liu et al. Efficient Solutions to Two-Party and Multiparty Millionaires' Problem Hindawi Security and Communication Networks—vol. 2017, Article ID 5207386—May 25, 2017 (Year: 2017).*

(Continued)

*Primary Examiner* — David J Pearson
(74) *Attorney, Agent, or Firm* — Oblon, McClelland, Maier & Neustadt, L.L.P.

(57) ABSTRACT

The present invention provides a technique for performing confidential sort at a faster speed than in the prior art. A confidential sort system comprises first to Mth apparatuses. The first to Mth apparatuses obtain inverse substitution $[[\sigma_0^{-1}]]$ of L-bit stable sort of $\{\vec{k}_0\}$. The first to Mth apparatuses perform, on $i=1, \ldots, N-1$, a process of converting $[[\sigma_{i-1}^{-1}]]$ to hybrid substitution to obtain $\{\sigma_{i-1}^{-1}\}$, a process of inversely substituting $\{\vec{k}_i\}$ with $\{\sigma_{i-1}^{-1}\}$ to obtain $\{\sigma_{i-1}^{-1}\vec{k}_i\}$, a process of obtaining inverse substitution $[[\sigma'_i^{-1}]]$ of L-bit stable sort of $[[\sigma_{i-1}^{-1}\vec{k}_i]]$, a process of synthesizing $\{\sigma_{i-1}^{-1}\}$ with $[[\sigma'_i^{-1}]]$ to obtain $[[\sigma_i^{-1}]]:=[[\sigma_{i-1}^{-1}\sigma'_i^{-1}]]$, and a process of converting $[[\sigma_{N-1}^{-1}]]$ to hybrid substitution to obtain $\{\sigma_{N-1}^{-1}\}$. The first to Mth apparatuses inversely substitute $[[\vec{v}]]$ with $\{\sigma_{N-1}^{-1}\}$ and output $[[\sigma_{N-1}^{-1}\vec{v}]]$.

4 Claims, 18 Drawing Sheets

---

Scheme 4-1 [Protocol] new cardinal number sort:  key processing

Input:   Attribute value $[[\vec{k}_0]]^{(Z\_2)^{\wedge}L}, \ldots, [[\vec{k}_{N-1}]]^{(Z\_2)^{\wedge}L} \in [[Z_2^L]]$, where NL=L'

Output:  Hybrid substitution representing inverse substitution of sort $\{\sigma_{N-1}^{-1}\}$ 1:  Obtain inverse substitution $[[\sigma_0^{-1}]]$ of L-bit stable sort of $\{\vec{k}_0\}$.

2:  for each $1 \leq i \leq N$ do

3:  Convert $[[\sigma_{i-1}^{-1}]]$ to hybrid substitution to obtain $\{\sigma_{i-1}^{-1}\}$.

4:  Inversely substitute $\{\vec{k}_i\}$ with $\{\sigma_{i-1}^{-1}\}$ to obtain $\{\sigma_{i-1}^{-1}\vec{k}_i\}$.

5:  Obtain inverse substitution $[[\sigma_i^{-1}]]$ of L-bit stable sort of $[[\sigma_{i-1}^{-1}\vec{k}_i]]$.

6:  Synthesize $\{\sigma_{i-1}^{-1}\}$ with $[[\sigma_i^{-1}]]$ to obtain $[[\sigma_i^{-1}]]:=[[\sigma_{i-1}^{-1}\sigma_i^{-1}]]$.

7:  Convert $[[\sigma_{N-1}^{-1}]]$ to hybrid substitution to obtain $\{\sigma_{N-1}^{-1}\}$ and output.

(56) References Cited

OTHER PUBLICATIONS

Emmadi et al. Updates on Sorting of Fully Homomorphic Encrypted Data 2015 International Conference on Cloud Computing Research and Innovation (Year: 2015).*

Hamada et al. Oblivious Radix Sort: An Efficient Sorting Algorithm for Practical Secure Multi-party Computation Cryptology ePrint Archive, Report 2014/121 (2014) (Year: 2014).*

International Search Report dated Dec. 25, 2018 in PCT/JP2018/037897 filed Oct. 11, 2018, 2 pages.

K. Hamada et al., "A Random Permutation Protocol on Three-Party Secure Function Evaluation," CSS2010, 2010.

S. Laur et al., "Round-efficient Oblivious Database Manipulation", ISC (Lai, X., Zhou, J. and Li, H., eds.), Lecture Notes in Computer Science, vol. 7001, Springer, pp. 1-16, (2011).

N. Kiribuchi et al., "An Efficient Equi-join Algorithm for Secure Computation and Its Implementation toward Secure Comprehensive Analyses of Users' Attribute and History Information," CSS2016, pp. 1072-1078 (2016).

K. Hamada et al., "Practically Efficient Multi-party Sorting Protocols from Comparison Sort Algorithms", ICISC 2012, pp. 202-216.

A. Shamir, "How to Share a Secret", Commun. ACM, vol. 22, No. 11, pp. 612-613 (1979).

M. Ben-Or et al., "Completeness Theorems for Non-Cryptographic Fault-Tolerant Distributed Computation (Extended Abstract)", STOC 1988, pp. 1-10.

R. Cramer et al., "Share conversion, pseudorandom secret-sharing and applications to secure computation", TCC, vol. 3378 of Lecture Notes in Computer Science, pp. 342-362, Springer, 2005.

D. Ikarashi et al., "Secure Database Operations Using An Improved 3-party Verifiable Secure Function Evaluation", SCIS 2011 (2011) with English abstract, 9 total pages.

D. Ikarashi et al., "An Unconditionally Private and Correct MPC Construction against the Active Adversary on Multiple Fields and an Application to Fast Secure Sorting," In SCIS2015 (2015) with English abstract, 9 total pages.

D. Ikarashi et al., "Actively Private and Correct MPC Scheme in t < n/2 from Passively Secure Schemes with Small Overhead", IACR Cryptology ePrint Archive, 2014, 18 total pages, 304, 2014.

D. Ikarashi et al., "A Design and an Implementation of Super-high-speed Multi-party Sorting: The Day When Multi-party Computation Reaches Scripting Languages" with English abstract, 9 total pages.

* cited by examiner

Scheme 4-1 [Protocol] new cardinal number sort: key processing

Input: Attribute value $[[\vec{k}_0]]^{(Z\_2)^{\wedge}L}, \ldots, [[\vec{k}_{N-1}]]^{(Z\_2)^{\wedge}L} \in [[Z_2^L]]$, where $NL=L'$ Output: Hybrid substitution representing inverse substitution of sort $\{\sigma_{N-1}^{-1}\}$ 1: Obtain inverse substitution $[[\sigma_0^{-1}]]$ of L-bit stable sort of $\{\vec{k}_0\}$.

2: for each $1 \leq i \leq N$ do

3:     Convert $[[\sigma_{i-1}^{-1}]]$ to hybrid substitution to obtain $\{\sigma_{i-1}^{-1}\}$.

4:     Inversely substitute $\{\vec{k}_j\}$ with $\{\sigma_{i-1}^{-1}\}$ to obtain $\{\sigma_{i-1} \vec{k}_j\}$.

5:     Obtain inverse substitution $[[\sigma_i'^{-1}]]$ of L-bit stable sort of $[[\sigma_{i-1} \vec{k}_j]]$.

6:     Synthesize $\{\sigma_{i-1}^{-1}\}$ with $[[\sigma_i'^{-1}]]$ to obtain $[[\sigma_i^{-1}]]:=[[\sigma_{i-1}^{-1}\sigma_i'^{-1}]]$.

7: Convert $[[\sigma_{N-1}^{-1}]]$ to hybrid substitution to obtain $\{\sigma_{N-1}^{-1}\}$ and output.

FIG. 2

Scheme 4-2 [New cardinal number sort: value processing]

Input: $\{\sigma_{N-1}^{-1}\}$, $[[I^{\rightarrow}v]]$, where $\sigma_{N-1}$ is substitution representing sort.

Output: $[[\sigma_{N-1}^{\rightarrow}v]]$

1: Inversely substitute $[[I^{\rightarrow}v]]$ with $\{\sigma_{N-1}^{-1}\}$ and output $[[\sigma_{N-1}^{\rightarrow}v]]$.

FIG. 3

Scheme 3-1 [flag creation]
Input: $[[k]]^{(Z\_2)^{\wedge}L}$

Output: $[[f]]^{(Z\_2)^{\wedge}L}$, $f_i = 0$ when $f_k = 1$, $i \neq k$

1: for each $j < L$ do in parallel
2:  Through mod 2 → mod q conversion (Scheme 3-3), convert $[[k_j]]^{Z\_2}$ to $[[k_j]]^{Z\_q}$. However, $q > m$
3: for each $\eta < \lceil \log L \rceil$ do in series
4:  for each $D \subseteq Z_L$ such that $2^{\eta}+1 \leq |D| \leq \min(2^{\eta+1}, L)$ do in parallel
5:   Calculate product of key $[[\Pi_{j \in D} k_j]]^{Z\_q}$. Since up to $(|D|+1)/2$ products have been calculated until last stage, number of multiplications is 1.
6: for each $j < 2^L$ do in parallel
7:  Obtain flag $[[f_j]]^{Z\_q}$ by linear coupling of key product.

FIG. 4

Scheme 3-2 [Rank table creation (off-line process)]

Input: $[[\vec{f}]]^{(Z\_q)^{\wedge}(2^{\wedge}L)}$

Output: $[[\vec{s}]]^{Z\_q}$, where "s" represents rank in 0 starting ascending order in comparison among respective elements of $\vec{k}$ before conversion of $\vec{f}$.

1: $[[S]]^{Z\_q} = [[0]]^{Z\_q}$
2: for each $j < 2^L$ do in series
3:   for each $i < m$ do in series
4:     $[[S]]^{Z\_q} := [[S]]^{Z\_q} + [[f_i]]^{Z\_q}$
5:     $[[s'_{i,j}]]^{Z\_q} := [[S]]^{Z\_q}$
6: for each $i < m$ do in parallel
7:   $[[s_i]] = \Sigma_{j<L}[[s'_{i,j}]]^{Z\_q}[[(f_i)_j]]^{Z\_q} - 1$

FIG. 5

Scheme 5 [protocol] new passive optimal cardinal number sort: whole key processing Input: Attribute value $\{\vec{k_0}\}^{\wedge}(Z_2^L), \ldots, \{\vec{k_{N-1}}\}^{\wedge}(Z_2^L) \in \{Z_2^L\}$, where $NL=L'$ Output: Hybrid substitution representing inverse substitution of sort $\{\sigma_{N-1}^{-1}\}$ 1: Perform first stage process (Scheme 5-1) using $\{\vec{k_0}\}^{\wedge}(Z_2^L)$ as input.

2: Perform processes in second and subsequent stages (Scheme 5-2) until Nth stage using output of previous stage and $\{\vec{k_j}\}^{\wedge}(Z_2^L)$ as input.

3. Output in final stage.

FIG. 7

Scheme 5-3 [new cardinal number sort: value processing]

Input: $\{\sigma_{N-1}^{-1}\}$, $[[\vec{v}]]$, where $\sigma_{N-1}$ is substitution representing sort.

Output: $[[\sigma_{N-1}\vec{v}]]$

1: Inversely substitute $[[\vec{v}]]$ with $\{\sigma_{N-1}^{-1}\}$ and output $[[\sigma_{N-1}\vec{v}]]$.

FIG. 8

Scheme 5-1 [protocol] new passive optimal cardinal number sort: initial stage

Input: $\{\vec{k_0}\}^{(Z\_2)^{\wedge}L} \in \{Z_2^L\}$

Output: Hybrid substitution representing inverse substitution of sort $\{\sigma_0^{-1}\}=[<\pi\sigma_0^{-1}>^{20}, \{\pi_j\}^{01,12}, \{\vec{k_{0,0}}\}^{Z\_2}, \{\vec{k_{0,1}}\}^{Z\_2},..., \{\vec{k_{0,L-1}}\}^{Z\_2}$ 1:  Through mod 2 → mod q conversion, convert $\{\vec{k_{0,0}}\}^{Z\_2}, \{\vec{k_{0,1}}\}^{Z\_2},..., \{\vec{k_{0,L-1}}\}^{Z\_2}$ to $[[\vec{k_{0,0}}]]^{Z\_q}, [[\vec{k_{0,1}}]]^{Z\_q},..., [[\vec{k_{0,L-1}}]]^{Z\_q}$.

2:  for each $\eta < \lceil \log L \rceil$ do in series

3:   for each $D \subseteq Z_L$ such that $2^\eta+1 \leq |D| \leq \min(2^{\eta+1}, L)$ do in parallel 4:    Calculate key product $[[K_D]]:=[[\prod_{w \in D} \vec{k_{0,w}}]]^{Z\_q}$. Since up to $(|D|+1)/2$ products are calculated until previous stage, the number of multiplications is 1.

5:  Up until here, for arbitrary $D \subseteq Z_L$, key product $[[K_D]] = [[\prod_{w \in D} \vec{k_{0,w}}]]^{Z\_q}$ is calculated.

6:  for each $j < 2^L$ do in parallel

7:   Assume wth bit of bit expression of j as $j_w$.

FIG. 9

8: Through key product linear coupling, obtain flag $[[\vec{f_j}]]^{Z\_q} = \prod_{j<L}[[\vec{k'_{0,w}}]]$. (Equivalent value can always be represented by linear coupling of respective $[[K_D]]$). However, $\vec{k'_{0,w}}$ is $1-\vec{k'_{0,w}}$ when $j_w=0$ (that is, bit inversion), $\vec{k'_{0,w}}$ when $j_w=1$.

9: Regarding each $\vec{f_j}$, calculate following prefix-sum.

$[[(\vec{f_j})_u]]^{Z\_q} := \sum_{0 \leq t \leq u}[[(\vec{f_j})_t]]^{Z\_q} + [[s_j]]^{Z\_q}$, where $s_0:=0$, $s_j := \sum_{0 \leq u < m}(\vec{f_{j-1}})_u + s_{j-1}$ That is, the sum of all elements before itself is assumed to be a value of the element in order of $\vec{f_0}, \vec{f_1}, \ldots, \vec{f_{2L-1}}$.

10: Through (2,2) output product-sum operation, calculate $[\sigma_0^{-1}]^{Z\_q,01} := \sum_{0 \leq j < 2^\wedge L}[\vec{f_j} \vec{f_j}]^{Z\_q,01}$.

11: Calculate and output $\langle \pi \sigma_0^{-1}\rangle^{20} := \{\pi\}^{01,12}[\sigma_0^{-1}]^{Z\_q,01}$.

FIG. 10

Scheme 5-2 [protocol] new passive optimal cardinal number sort: from second stage onward Input: $\{\vec{k_{i,j}}\}^{\wedge}(Z_{2^L}) \in \{Z_{2^L}\}$, $[\sigma_{i-1}] = [<\pi_0\sigma_{i-1}^{-1}>^{20}, \{\pi_0\}^{01,12}]$ Output: hybrid substitution representing inverse substitution of sort $\{\sigma_i^{-1}\} = [<\pi\sigma_i^{-1}>^{20}, \{\pi\}^{01,12}]$ 1: Convert $\{\vec{k_{i,0}}\}^{Z\_2}, \{\vec{k_{i,j}}\}^{Z\_2}, ..., \{\vec{k_{i,L-1}}\}^{Z\_2}$ to (2,2) additive secret variance $[\vec{k_{i,0}}]^{Z\_2,01}, [\vec{k_{i,1}}]^{Z\_2,01}, ..., [\vec{k_{i,L-1}}]^{Z\_2,01}$. (Off line)

2: Inversely apply $\{\sigma_{i-1}^{-1}\}$ to $[\vec{k_{i,0}}]^{Z\_2,01}, [\vec{k_{i,1}}]^{Z\_2,01}, ..., [\vec{k_{i,L-1}}]^{Z\_2,01}$ to obtain $[\vec{b_0}]^{Z\_2,20} := [\sigma_{i-1}\vec{k_{i,1}}]^{Z\_2,20}, [\vec{b_1}]^{Z\_2,20} := [\sigma_{i-1}\vec{k_{i,1}}]^{Z\_2,20}$, $[\vec{b_1}]^{Z\_2,20} := [\sigma_{i-1}\vec{k_{i,1}}]^{Z\_2,20}, ..., [\vec{b_{L-1}}]^{Z\_2,20} := [\sigma_{i-1}\vec{k_{i,L-1}}]^{Z\_2,20}$. It should be noted that the output becomes (2,2)-additive secret variance different from the input in party set.

3: Convert $[\vec{b_0}]^{Z\_2,20}, [\vec{b_1}]^{Z\_2,20}, ..., [\vec{b_{L-1}}]^{Z\_2,20}$ to $[[\vec{b_0}]]^{Z\_q}, [[\vec{b_1}]]^{Z\_q}, ..., [[\vec{b_{L-1}}]]^{Z\_q}$ through mod 2 → mod q conversion.

4: for each $\eta < \lceil \log L \rceil$ do in series

5: for each $D \subseteq Z_L$ such that $2^{\eta}+1 \leq |D| \leq \min(2^{\eta+1}, L)$ do in parallel 6: Calculate key product $[[K_D]] := [[\prod_{w \in D} \vec{k_{i,w}}]]^{Z\_q}$. Since product of up to $(|D|+1)/2$ products are calculated until previous stage, the number of multiplications is 1.

FIG. 11

7: Key product $[[K_D]] := [[\prod_{j \in D} \vec{k}_{i,w}]]^{Z\_q}$ for arbitrary $D \subseteq \underline{Z}_L$ has been calculated so far.
8: for each $j < 2^L$ do in parallel
9: Wth bit of bit expression of j is assumed to be $j_W$.
10: Using linear coupling of key product, obtain flag $[[\vec{f}_j]]^{Z\_q} := \prod_{j < L}[[\vec{k}_{i,w}]]$ (equivalent value can always be expressed with linear coupling of respective $[[K_D]]$). However, $\vec{k}'_{i,w}$ is $1 - \vec{k}_{i,w}$ (that is, bit inversion) when $j_W = 0$, or $\vec{k}'_{i,w}$ when $j_W = 1$.

11: For each $\vec{f}_j$, calculate following prefix-sum.

$[[(\vec{f}_j)_u]]^{Z\_q} := \sum_{0 \leq t < u}[[(\vec{f}_j)_t]]^{Z\_q} + [[s_j]]^{Z\_q}$, where $s_0 := 0$ and $s_j := \sum_{0 \leq u \leq m}(\vec{f}_{j-1})_u + s_{j-1}$ when $j > 0$ That is, the sum of all elements before itself is assumed to be a value of the element in order of $\vec{f}_0, \vec{f}_1, \ldots, \vec{f}_{2L-1}$.

12: Through (2,2) output product-sum operation, calculate $[\sigma^{i-1}]^{Z\_q,20} := \sum_{0 \leq j < 2^L}[\vec{f}_j \vec{f}_j]^{Z\_q,20}$.

13: Apply $\{\sigma_{i-1}^{-1}\}$ to $[\sigma^{-1}]^{Z\_q,20}$ to obtain $[\sigma^{-1}]^{Z\_q,01} := [\sigma_{i-1}^{-1}\sigma^{i-1}]^{Z\_q,01}$.

14: Calculate and output $\langle \pi\sigma_i^{-1}\rangle^{20} := \{\pi_i\}^{01,12}[\sigma^{-1}]^{Z\_q,01}$.

FIG. 12

Scheme 3-3 [protocol] mod 2 → mod q conversion

Input: $\{a\}^{Z_2}$
Output: $[[a]]^{Z_q}$

1: Generate random number $\{r\}^{Z_2}$.
2: Assume $r_{01} := \{r\}_{01}^{Z_2}$, $r_{12} := \{r\}_{12}^{Z_2}$, $r_{20} := \{r\}_{20}^{Z_2}$,
   Regarding each element as replicated secret variance of mod q, assume $\{r_{01}\}^{Z_q}$, $\{r_{12}\}^{Z_q}$, and $\{r_{20}\}^{Z_q}$.
   For example, $r_{01}$ may be regarded as $(0, r_{01})$, $(r_{01}, 0)$, $(0, 0)$.
3: $\{r\}^{Z_q} := \{r_{01}\}^{Z_q} (+) \{r_{12}\}^{Z_q} (+) \{r_{20}\}^{Z_q}$
   where $(+)$ is XOR and equation $a (+) b = a + b - 2a$ can be used.
4: Through replicated secret variance → Shamir conversion, calculate $[[r]]^{Z_q}$.
5: $a' := \text{reveal}(\{a + r\}^{Z_2})$
6: $[[a]]^{Z_q} := a' (+) [[r]]^{Z_q}$, that is,
7:   if $a (+) r = 0$, $[[a]]^{Z_q} := [[r]]^{Z_q}$
8:   if $a (+) r = 1$, $[[a]]^{Z_q} := 1 - [[r]]^{Z_q}$

FIG. 13

Scheme 5-4 [protocol] (2,2) output product-sum
Input: $[[a_0]], \ldots, [[a_{u-1}]], [[b_0]], \ldots, [[b_{u-1}]]$
Output: $\sum_{0 \leq i < u} [a_i b_i]^{01}$ 1: Round 0
2: Parties $P_0$ and $P_2$ share random number r.
3: Round 1
4: Each party P calculates $c_P := \sum_{0 \leq i < u} [[a_i]]_P [[b_i]]_P$.
5: Party $P_2$ distributes $\lambda_2 c_2$ into $P_0$ and $P_1$ through (2,2) additive secret variance. More specifically, send $c'_2 := \lambda_2 c_2 - r$ to $P_1$. r shared in advance is share of $P_0$.

However, $\lambda_0$, $\lambda_1$ and $\lambda_2$ are coefficients when reconstructing (3,3)-Shamir secret variance distributed into $P_0$, $P_1$ and $P_2$ (order of which is raised by product-sum).

6: Party $P_0$ outputs $\lambda_0 c_0 + r$, and party $P_1$ outputs $\lambda_1 c_1 + c'_2$.

FIG. 14

Scheme 5-5 [(2,2) additive sub-public value output random substitution]
Input share possessing party: $P_{in} = \{P_0, P_1\}$
Output share possessing party: $P_{out} = \{P_2, P_0\}$ Input: $[\vec{a}]^{01} \in [X]^{01}$ Output: $\langle \pi \vec{a} \rangle^{20}$ 1: Round 0 (advance processable part)
2: Generate substitution $\{\pi\}^{01,12}$
3: $P_0$ and $P_1$ share $\vec{r}_{01}$.
4: Round 1
5: $P_0$ sends $\vec{a}^{\rightarrow}_{P\_0} := \{\pi\}_{01}[\vec{a}]_0^{01} - \vec{r}_{01}$ to $P_2$.
6: $P_1$ sends $\vec{a}^{\rightarrow}_{P\_1} := \{\pi\}_{01}[\vec{a}]_1^{01} + \vec{r}_{01}$ to $P_2$.
7: Round 2
8: $P_2$ calculates $\pi\vec{a} := \{\pi\}_{20}\{\pi\}_{12}(\vec{a}^{\rightarrow}_{P\_0} + \vec{a}^{\rightarrow}_{P\_1})$ and send this to $P_0$.
9: $P_0$ and $P_2$ output $\pi\vec{a}$.

FIG. 15

Scheme 5-1 [protocol] new passive optimal cardinal number sort: initial stage

Input: $[\vec{k}_{0,0}]^{Z\_2}, [\vec{k}_{0,1}]^{Z\_2} \in \{Z_2\}$

Output: hybrid substitution representing inverse substitution of sort $\{\sigma_i^{-1}\} = (\langle \pi\sigma_0^{-1} \rangle^{2,0}, \{\pi_j\}^{01,12})$.

1: Through mod 2 → mod q conversion, convert $\{\vec{k}_{0,0}\}^{Z\_2}, \{\vec{k}_{0,0}\}^{Z\_2}$ to $[[\vec{k}_{0,0}]]^{Z\_q}, [[\vec{k}_{0,1}]]^{Z\_q}$.

2: Calculate $[[\vec{f}_3]]^{Z\_q} := [[\vec{k}_{0,0}]]^{Z\_q} [[\vec{k}_{0,1}]]^{Z\_q}$, 3: Calculate $[[\vec{f}_2]]^{Z\_q} := [[\vec{k}_{0,1}]]^{Z\_q} - [[\vec{f}_3]]^{Z\_q}$ $[[\vec{f}_1]]^{Z\_q} := [[\vec{k}_{0,0}]]^{Z\_q} - [[\vec{f}_3]]^{Z\_q}$ $[[\vec{f}_0]]^{Z\_q} := 1 - [[\vec{k}_{0,0}]]^{Z\_q} - [[\vec{k}_{0,1}]]^{Z\_q} + [[\vec{f}_3]]^{Z\_q}$, 4: For each $f_j$, calculate following prefix-sum.

$[[(\vec{f}_j)_u]]^{Z\_q} := \sum_{0 \le t < u}[[\vec{f}_j]_t]^{Z\_q} + [[s_j]]^{Z\_q}$, where $s_0 := 0$ and $s_j := \sum_{0 \le u < m}(\vec{f}_{j-1})_u - s_{j-1}$ when $j > 0$.

That is, the sum of all elements before itself is assumed to be a value of the element in order of $f_0, f_1, f_2, f_3$.

5: Through (2,2) output product-sum operation, calculate $[\sigma_0^{-1}]^{Z\_q,01} := \sum_{0 \le j < 4}[\vec{f}_j]^{Z\_q,01}$.

6: Calculate and output $\langle \pi\sigma_0^{-1} \rangle^{2,0} := \{\pi_j\}^{01,12}[\sigma_0^{-1}]^{Z\_q,01}$.

FIG. 16

Scheme 5-2 [protocol] new passive optimal cardinal number sort: second stage onward Input: $\{\vec{k}_{i,0}\}^{Z\_2}, \{\vec{k}_{i,1}\}^{Z\_2} \in \{Z_2\}$, output of previous stage $\{\sigma_{i-1}^{-1}\}=(\langle\pi_0\sigma_{i-1}^{-1}\rangle^{01}, \{\pi_0\}^{01,12})$ Output: hybrid substitution representing inverse substitution of sort $\{\sigma_i^{-1}\}=(\langle\pi_0\sigma_i^{-1}\rangle^{20}, \{\pi_i\}^{01,12})$.

1: Convert $\{\vec{k}_{i,0}\}^{Z\_2}, \{\vec{k}_{i,1}\}^{Z\_2}$ to $(2,2)$ additive secret variance $[\vec{k}_{i,0}]^{Z\_2,01}, [\vec{k}_{i,1}]^{Z\_2,01}$. (Off line)

2: Inversely apply $\{\sigma_{i-1}^{-1}\}$ to $[\vec{k}_{i,0}]^{Z\_2,01}, [\vec{k}_{i,0}]^{Z\_2,01}$ to obtain $[\vec{b}_0]^{Z\_2,20} := [\sigma_0 \to \vec{k}_{i,0}]^{Z\_2,20}$, $[\vec{b}_1]^{Z\_2,20} := [\sigma_0 \to \vec{k}_{i,1}]^{Z\_2,20}$. It should be noted that the output becomes $(2,2)$-additive secret variance different from the input in party set.

3: Convert $[\vec{b}_0]^{Z\_2,20}, [\vec{b}_1]^{Z\_2,20}$ to $[[\vec{b}_0]]^{Z\_q}, [[\vec{b}_1]]^{Z\_q}, [[\vec{b}_0]]^{Z\_q}, [[\vec{b}_1]]^{Z\_q}$ through mod 2 $\to$ mod q conversion.

4: Calculate $[[\vec{f}_3]]^{Z\_q} := [[\vec{b}_0]]^{Z\_q} [[\vec{b}_1]]^{Z\_q}$, 5: Calculate $[[\vec{f}_2]]^{Z\_q} := [[\vec{k}_{i,1}]]^{Z\_q} - [[\vec{f}_3]]^{Z\_q}$, $[[\vec{f}_1]]^{Z\_q} := [[\vec{k}_{i,0}]]^{Z\_q} - [[\vec{f}_3]]^{Z\_q}$, and $[[\vec{f}_0]]^{Z\_q} := 1 - [[\vec{k}_{i,0}]]^{Z\_q} - [[\vec{k}_{i,1}]]^{Z\_q} + [[\vec{f}_3]]^{Z\_q}$.

FIG. 17

6. For each $f_j$, calculate following prefix-sum.

$$[[(\vec{f}_j)_u]]^{Z\_q} := \sum_{0 \leq t \leq u} [[\vec{f}_j]_t]^{Z\_q} + [[s_j]]^{Z\_q},$$

where $s_0 := 0$ and $s_j := \sum_{0 \leq u \leq m} (\vec{f}_{j-1})_u + s_{j-1}$ when $j > 0$.

That is, the sum of all elements before itself is assumed to be a value of the element in order of $f_0, f_1, f_2, f_3$.

7. Through (2,2) output product-sum operation, calculate $[\sigma^{i-1}]^{Z\_q,20} := \sum_{0 \leq j < 4} [\vec{f}'_j \rightarrow f_j]^{Z\_q,20}$.

8. Apply $\{\sigma_{i-1}^{-1}\}$ to $[\sigma^{-1}]^{Z\_q,20}$ to obtain $[\sigma^{-1}]^{Z\_q,01} := [\sigma_{i-1}^{-1} \sigma'^{-1}]^{Z\_q,01}$.

9. Calculate and output $\langle \pi \sigma_i^{-1} \rangle^{20} := \{\pi_j\}^{01,12} [\sigma^{-1}]^{Z\_q,01}$.

FIG. 18

CONFIDENTIAL SORT SYSTEM AND METHOD

TECHNICAL FIELD

The present invention relates to an information security technique.

BACKGROUND ART

As a conventional confidential sort technique, a technique described in Non-patent literature 1 is known.

PRIOR ART LITERATURE

Non-Patent Literature

Non-patent literature 1: Dai Ikarashi, Ryo Kikuchi, Koki Hamada, Koji Chida, "An Unconditionally Private and Correct MPC Construction against the Active Adversary on Multiple Fields and an Application to Fast Secure Sorting," In SCIS2015, 2015.

SUMMARY OF THE INVENTION

Problems to be Solved by the Invention

The technique described in Non-patent literature 1 above had a large communication amount associated with sort processing, and so sort processing could be slowed down with communication becoming a bottleneck.

It is an object of the present invention to provide a confidential sort system and method capable of performing a confidential sort at a speed faster than in the prior art.

Means to Solve the Problems

A confidential sort system according to an aspect of the present invention comprises first, second, . . . , and Mth apparatuses. Assuming that a body of data to be sorted is a value $\vec{v}$, a tag that determines order after the sort is a key, a bit length of the key is L', N is a predetermined positive integer, an (n+1)th (n=0, . . . , N−1) bit string when the key is divided into N bit strings is $\vec{k}_n$, an arbitrary value or substitution is $x^A$, $\{x^A\}$ is a replicated secret variance of $x^A$, an arbitrary value is $x^A$, $[[x^A]]$ is a secret variance having homomorphism of $x^A$ and M is a predetermined positive integer of 2 or more, the first, second, . . . , and Mth apparatuses obtain inverse substitution $[[\sigma_0^{-1}]]$ of L-bit stable sort of $\{\vec{k}_0\}$. The first, second, . . . , and Mth apparatuses perform, on i=1, . . . , N−1, a process of obtaining $\{\sigma_{i-1}^{-1}\}$ by converting $[[\delta_{i-1}^{-1}]]$ to hybrid substitution, a process of obtaining $\{\sigma_{i-1}\vec{k}_i\}$ by inversely substituting $\{\vec{k}_i\}$ using $\{\sigma_{i-1}^{-1}\}$, a process of obtaining inverse substitution $[[\sigma'_i^{-1}]]$ of L-bit stable sort of $[[\sigma_{i-1}\vec{k}_i]]$, a process of obtaining $[[\sigma_i^{-1}]]:=[[(\sigma_{i-1}^{-1}\sigma'_i^{-1}]]$ by synthesizing $\{\sigma_{i-1}^{-1}\}$ with $[[\sigma'_{i-1}^{-1}]]$, and a process of obtaining $\{\sigma_{N-1}^{-1}\}$ by converting $[[\sigma_{i-1}^{-1}]]$ to hybrid substitution. The first, second, . . . , and Mth apparatuses output $[[\sigma_{N-1}\vec{v}]]$ by inversely substituting $[[\vec{v}]]$ using $\{\sigma_{N-1}^{-1}\}$.

A confidential sort system according to an aspect of the present invention comprises first, second, . . . , and Mth apparatuses. Assuming that a body of data to be sorted is value $\vec{v}$, a tag that determines order after the sort is a key, a bit length of the key is L', N is a predetermined positive integer, an (n+1)th (n=0, . . . , N−1) bit string when the key is divided into N bit strings is $\vec{k}_n$, an arbitrary value or substitution is $x^A$, $\{x^A\}$ is a replicated secret variance of $x^A$, an arbitrary value is $x^A$, $[[x^A]]$ is a secret variance having homomorphism of $x^A$, $\langle x^A \rangle$ is a semi-public value, $[x^A]$ is a (2,2) additive secret variance, $\{\vec{k}_i\}^{(Z\_2)\wedge L}=(\{\vec{k}_{i,0}\}^{Z\_2}, \{\vec{k}_{i,1}\}^{Z\_2}, \ldots, \{\vec{k}_{i,L-1}\}^{Z\_2})$ (i=0, . . . , N−1), q is a predetermined positive integer, an arbitrary vector is $\vec{f}^A$, $(\vec{f}^A)_u$ is a uth element of vector $\vec{f}^A$, $s_0:=0$, $s_j:=\Sigma_{0 \leq u < m}(\vec{f}_{j-1})_u + s_{j-1}$ for j=1, . . . , 3, the number of elements of vector $\vec{f}_{j-1}$ is m, 01 represents a set of the first and second apparatuses, 12 represents a set of the second and third apparatuses, 20 represents a set of the third and first apparatuses, G is an arbitrary group, ring or body, P is a set of apparatuses, $[x^A]^{G,P}$ represents a share of $[x^A]$ represented on G of P, π is predetermined substitution, $\{\pi\}_P$ means a sub-share of $\{\pi\}$ shared by P, $\{\pi\}^{01,12}$ represents a replicated secret variance in which $\pi=\{\pi\}_{12}\{\pi\}_{01}$, $\langle \pi\sigma_i^{-1}\rangle^{20}$ represents that $\pi\sigma_i^{-1}$ is shared by the third and first apparatuses, the first, second and third apparatuses perform a process of converting, through mod 2→mod q conversion, $\{\vec{k}_{0,0}\}^{Z\_2}, \{\vec{k}_{0,1}\}^{Z\_2}, \ldots, \{\vec{k}_{0,L-1}\}^{Z\_2}$ to $[[\vec{k}_{0,0}]]^{Z\_q}, [[\vec{k}_{0,1}]]^{Z\_q}, \ldots, [[\vec{k}_{0,L-1}]]^{Z\_q}$, a process of calculating $[[K_D]]:=[[\Pi_{w \in D}\vec{k}_{0,w}]]^{Z\_q}$ for each set of a positive integer η satisfying η<⌈log L⌉ and D satisfying $D \subseteq Z_L$ and $2^\eta + 1 \leq |D| \leq \min(2^{\eta+1}, L)$, a process of calculating $[[\vec{f}_j]]^{Z\_q}:=\Pi_{j<L}[[\vec{k}'_{0,w}]]$ for each j where $j<2^L$ assuming the wth bit of bit expression of j as $j_w$, and assuming $\vec{k}'_{0,w}$ to be $\vec{k}'_{0,w}=1-\vec{k}_{0,w}$ when $j_w=0$ and $\vec{k}'_{0,w}=\vec{k}_{0,w}$ when $j_w=1$, a process of calculating $[[(\vec{f}_j)_u]]^{Z\_q}:=\Sigma_{0 \leq t < u}[[(\vec{f}_j)_t]]^{Z\_q}+[[(s_j)]]^{Z\_q}$, a process of calculating $[\sigma_0^{-1}]^{Z\_q,01}:=\Sigma_{0 \leq j < 2 \wedge L}[\vec{f}_j \vec{f}_j]^{Z\_q,01}$ through a (2,2) output product sum operation, and a process of calculating $\langle \pi\sigma_0^{-1}\rangle^{20}:=\{\pi\}^{01,12}[\sigma_0^{-1}]^{Z\_q,01}$. The first, second and third apparatuses perform a process of converting $\{\vec{k}_{i,0}\}^{Z\_2}, \{\vec{k}_{i,1}\}^{Z\_2}, \ldots, \{\vec{k}_{i,L-1}\}^{Z\_2}$ to (2,2) additive secret variance $[\vec{k}_{i,0}]^{Z\_2,01}, [\vec{k}_{i,1}]^{Z\_2,01}, \ldots, [\vec{k}_{i,L-1}]^{Z\_2,01}$ assuming i=1, . . . , N−1, a process of inversely applying $\{\sigma_{i-1}^{-1}\}$ to $[\vec{k}_{i,0}]^{Z\_2,01}, [\vec{k}_{i,1}]^{Z\_2,01} \ldots, [\vec{k}_{i,L-1}]^{Z\_2,01}$ to obtain $[\vec{b}_0]^{Z\_2,20}:=[\sigma_{i-1}\vec{k}_{i,0}]^{Z\_2,20}, [\vec{b}_1]^{Z\_2,20}:=[\sigma_{i-1}\vec{k}_{i,1}]^{Z\_2,20}, \ldots, [\vec{b}_{L-1}]^{Z\_2,20}:=[\sigma_{i-1}\vec{k}_{i,L-1}]^{Z\_2,20}$, a process of converting $[\vec{b}_0]^{Z\_2,20}, [\vec{b}_1]^{Z\_2,20}, \ldots, [\vec{b}_{L-1}]^{Z\_2,20}$ to $[[\vec{b}_0]]^{Z\_q}, [[\vec{b}_1]]^{Z\_q}, \ldots, [[\vec{b}_{L-1}]]^{Z\_q}$ through mod 2→mod q conversion, a process of calculating $[[K_D]]:=[[\Pi_{w \in D}\vec{k}_{0,w}]]^{Z\_q}$ for each set of a positive integer η satisfying η<⌈log L⌉ and $D \subseteq Z_L$ and D satisfying $2^\eta + 1 \leq |D| \leq \min(2^{\eta+1}, L)$, a process of calculating $[[\vec{f}_j]]^{Z\_q}:=\Pi_{j<2^L}[[\vec{k}'_{i,w}]]$ for each j where $j<2^L$ assuming the wth bit of bit expression of j as $j_w$, and assuming as when $j_w=1$ and $\vec{k}'_{i,w}=\vec{k}_{i,w}$ when $j_w=1$, a process of calculating $[[(\vec{f}_j)_u]]^{Z\_q}:=\Sigma_{0 \leq t \leq u}[[(\vec{f}_j)_t]]^{Z\_q}+[[s_j]]^{Z\_q}$, a process of calculating $[\sigma^{-1}]^{Z\_q,20}:=\Sigma_{0 \leq j < 2 \wedge L}[\vec{f}_j \vec{f}_j]^{Z\_q,20}$ through a (2,2) output product sum operation and a process of calculating $[\sigma^{-1}]^{Z\_q,01}:=[\sigma_{i-1}^{-1}\sigma'^{-1}]^{Z\_q,01}$ by applying $\{\sigma_{i-1}^{-1}\}$ to $[\sigma^{-1}]^{Z\_q,20}$ and a process of calculating $\langle \pi\sigma_i^{-1}\rangle^{20}:=\{\pi\}^{01,12}[\sigma^{-1}]^{Z\_q,01}$ on i=1, . . . , N−1. The first, second, . . . , and Mth apparatuses inversely substitute $[[\vec{v}]]$ as $\{\sigma^{-1}\}=(\langle \pi\sigma_{N-1}^{-1}\rangle^{20}, \{\pi\}^{01,12})$ with $\{\sigma^{-1}\}$ and output $[[\sigma\vec{v}]]$.

Effects of the Invention

It is possible to perform a confidential sort at a speed faster than in the prior art.

BRIEF DESCRIPTION OF THE DRAWINGS

FIG. 2 is a diagram for describing the first embodiment;
FIG. 3 is a diagram for describing the first embodiment;

FIG. 4 is a diagram for describing the first embodiment;

FIG. 5 is a diagram for describing the first embodiment;

FIG. 7 is a diagram for describing the second embodiment;

FIG. 8 is a diagram for describing the second embodiment;

FIG. 9 is a diagram for describing the second embodiment;

FIG. 10 is a diagram for describing the second embodiment;

FIG. 11 is a diagram for describing the second embodiment;

FIG. 12 is a diagram for describing the second embodiment;

FIG. 13 is a diagram for describing the second embodiment;

FIG. 14 is a diagram for describing the second embodiment;

FIG. 15 is a diagram for describing the second embodiment;

FIG. 16 is a diagram for describing the second embodiment;

FIG. 17 is a diagram for describing the second embodiment; and

FIG. 18 is a diagram for describing the second embodiment.

DETAILED DESCRIPTION OF THE EMBODIMENTS

Figure 1:
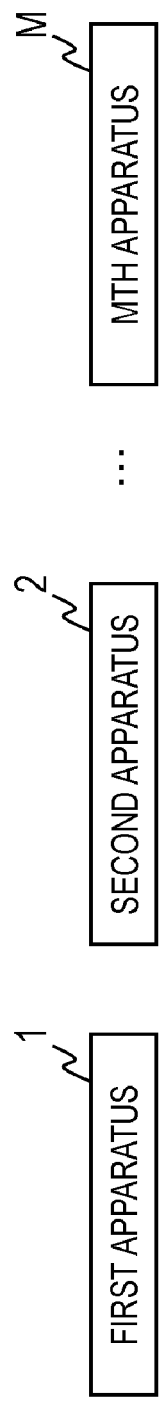
FIG. 1 is a block diagram illustrating an example of a confidential sort system of a first embodiment.

Hereinafter, an embodiment of the present invention will be described with reference to the accompanying drawings. Note that in mathematical expressions or the like, when the base of a log is omitted, the base is assumed to be 2.

[Preparations]

Examples of sort targets include a key and a value. The key is a tag to determine order after a sort and the value is the body of data to be sorted. The key and the value may be identical.

A secret variance refers to a set of virtually collected secretly distributed shares of all parties.

A result of applying substitution $\pi$ to vector $\vec{x}$ is multiplicatively written as $\pi\vec{x}$. Furthermore, the integer vector is also handled as substitution and multiplicative notation $\vec{y}\vec{x}$ of a vector represents substitution of $\vec{x}$ by $\vec{y}$. Note that for simplification of description, "→" that means a vector may be omitted.

Symbols are defined as follows.

m: The number of elements of a vector to be sorted and substituted.

L': Bit length of key.

p, q: Prime number.

|p|, |q|: Bit length of prime number.

$[[x]]$: Secret variance having homomorphism. That is, when an arbitrary value is assumed as $x^A$, $[[x^A]]$ is a secret variance having homomorphism of $x^A$.

$\{x\}$: Notation explicitly showing that this is a replicated secret variance. That is, when an arbitrary value or substitution is assumed as $x^A$, $\{x^A\}$ is a replicated secret variance of $x^A$.

$[x]$: (2,2) additive secret variance.

$<x>$: Semi-public value. That is, plain text shared by k parties.

$[[X]]$: Set of secret variances on X.

$[x]^{X,P}$: First subscript on the shoulder of the above-described variance represents a group/ring/body and the second subscript represents a party set having shares. That is, assuming that G is an arbitrary group, ring or body and P is a set of apparatuses, $[x]^{G,P}$ represents a share of $[x]$ owned by P and represented on G.

$\vec{x}, [[\vec{x}]]^X$: Vector having a length of m and a secret variance thereof.

P': Set of whole party.

01,12,20: When used as subscripts, these numbers represent a party set of parties 0 and 1, parties 1 and 2 and parties 2 and 0. For example, 01 represents a set of the first and second apparatuses, 12 represents a set of the second and third apparatuses and 20 represents a set of the third and first apparatuses. Note that the first apparatus may be represented by $P_0$, the second apparatus may be represented by $P_1$ and the third apparatus may be represented by $P_2$.

$[[x]]_P$: Share of party P.

$\{\pi\}$: Replicated secret variance of substitution $\pi$.

$\{\pi\}_P$: Fraction (subshare) of $\{\pi\}$ shared by $P \in P'$.

Replicated secret variance of substitution with subscript such as $\{\pi\}^{01,12,20}$:

Replicated secret variance which becomes $\pi=\{\pi\}_{20}\{\pi\}_{12}\{\pi\}_{01}$. That is, notation when even the application order of substitution is taken into consideration. Replicated secret variance of substitution with fewer than three subscripts such as $\{\pi\}^{01,12}$: Replicated secret variance which becomes $\pi=\{\pi\}_{12}\{\pi\}_{01}$.

Here, the replicated secret variance is a secret variance sharing the same value within a party set for each of a plurality of party sets. For example, assuming that (2,3)-replicated secret variance is $a=a_{01}+a_{12}+a_{20}$, shares of the respective parties are $(a_{20},a_{01})$, $(a_{01},a_{12})$ and $(a_{12},a_{20})$. Each $a_{01}$, $a_{12}$ or $a_{20}$ is called "subshare." Here, using the fact that the substitution is a group, the substitution is also used as a secret variance to be kept confidential.

A sort is a kind of substitution. Here, a theory of substitution in secret calculation will be configured and an efficient and simple cardinal number sort will be configured based on the theory.

Substitution has never been handled systematically in secret calculation. Here, substitution will be systematically adjusted so that substitution may be handled more freely. First of all, substitution itself and substitution in existing secret calculation will be reviewed and the theory of substitution will be developed based thereon.

"Substitution" is a mathematical structure that expresses rearrangement. For example, substitution (0,2,1) rearranges vector (10,5,2) to (10,2,5).

Substitution is known to form a non-exchangeable group. That is, a unit element exists (identical substitution, substitution without changing arrangement), an inverse element exists (after substitution, substitution with inverse element returns to the original arrangement) and an associative law holds.

Random substitution in secret calculation has been proposed and improved independently by the author et al. and Laur (e.g., see Reference Documents 1 and 2). Since the replicated secret variance can be configured of a group, it is possible to consider a replicated secret variance of substitution, and in the case of, for example, (2,3)-replicated secret variance, when $\pi=\pi_{20}\pi_{12}\pi_{01}$, respective variances are $(\pi_{20}, \pi_{01})$, $(\pi_{01}; \pi_{12})$ and $(\pi_{12},\pi_{20})$. All the above random substitutions can be regarded as protocols that apply this substitution.

Reference Document 1

Koki Hamada, Dai Ikarashi, Koji Chida, Katsumi Takahashi, "A Random Permutation Protocol on Three-Party Secure Function Evaluation," CSS2010 (2010).

Reference Document 2

Laur, S., Willemson, J. and Zhang, B., "Round-Efficient Oblivious Database Manipulation", ISC (Lai, X., Zhou, J. and Li, H., eds.), Lecture Notes in Computer Science, Vol. 7001, Springer, pp. 262-277 (2011).

When inverse elements $(\{\pi\}^{01})^{-1}$, $(\{\pi\}^{12})^{-1}$, $(\{\pi\}^{20})^{-1}$ of the respective subshares $\{\pi\}^{01}$, $\{\pi\}^{12}$, $\{\pi\}^{20}$ of substitution $\{\pi\}$ are executed so as to be applied in reverse order according to a random substitution protocol, the same effect as that when substitution is performed with inverse matrix $\{\pi\}^{-1}$ (e.g., see Reference Document 3). This can be used for processing such as performing random substitution once and returning to the original arrangement.

Reference Document 3

Naoto Kiribuchi, Dai Ikarashi, Gembu Morohashi, Koki Hamada, "An Efficient Equi-join Algorithm for Secure Computation and Its Implementation toward Secure Comprehensive Analyses of Users' Attribute and History Information," CSS2016 (2016).

A replicated secret variance of substitution is called "native substitution" in the present invention. The native substitution alone can only express random substitution but cannot handle a wider variety of substitution. Therefore, the present specification will introduce two types of substitution: index substitution and hybrid substitution.

A vector with an integer variance having length in and including different values of 0 to m−1 as elements is called "index substitution." Although index substitution cannot be directly applied as substitution, it is possible to synthesize substitution with native substitution by applying native substitution. When, for example, application of $\{\rho\}$ to $[[\pi]]$ results in $[[\rho\pi]]$, and this gives synthesized index substitution. When synthesis is applied to index substitution $[[I]]$ of identical substitution I, it is also possible to convert native substitution $\{\pi\}$ to index substitution $[[\pi]]$.

Hybrid substitution is a set of native substitution and substitution of plain text. It is assumed that $(\{\rho\}, \rho^{-1}\pi)$ is written as $\{\{\pi\}\}$, and this is called "hybrid substitution." Since conversion from hybrid substitution to native substitution is an off-line process, $\{\{\pi\}\}$ may be written as $\{\pi\}$. Since the hybrid substitution is a set of native substitution and substitution of plain text, when hybrid substitution is applied in order, application and inverse application are made possible. Furthermore, since application is possible, it is possible to synthesize index substitution with substitution and perform conversion to index substitution.

With hybrid substitution, conversion from index substitution is further possible. Applying $\{\rho^{-1}\}$ to $[[\pi]]$ results in $[[\rho^{-1}\pi]]$ and obtains $\rho^{-1}\pi$ by public disclosure. $(\{\rho\}, \rho^{-1}\pi)$ constitutes hybrid substitution.

Since index substitution can handle any substitution other than random substitution, hybrid substitution can also keep confidential non-random substitutions. Hybrid substitution is necessary to apply non-random substitution with confidentiality.

Hybrid substitution can also be converted to native substitution. When $\{\rho\}$ is written as $\{\rho\}^{01,12,20}$, $\rho^{-1}\pi$ may be synthesized with $\{\rho\}_{20}^{01,12,20}$. Since $\rho^{-1}\pi$ is a public value, this process is off line.

Note that since conversion from hybrid substitution to native substitution is an off-line process, according to a protocol with abstract granularity, hybrid substitution is identified with native substitution and written as $\{\pi\}$.

The following summarizes the above-described simply configurable substitution operations. It is possible to freely perform four operations of substitution, inverse substitution, conversion and synthesis not only via native substitution but also via index substitution and hybrid substitution. It should be noted that synthesis requires index substitution and substitution/inverse substitution after the synthesis requires hybrid substitution.

[[Substitution Application]]
1. Native substitution: $\{\pi\}[[x]]=[[x]]$ (random substitution protocol)
2. Index substitution: performed not directly but via hybrid substitution.
3. Hybrid substitution: $(\{\rho\}\rho^{-1}\pi[[x]])$

[[Inverse Substitution Application]]
1. Native substitution: $\{\pi\}[[x]]$
2. Index substitution: performed not directly but via hybrid substitution.
3. Hybrid substitution: $(\rho^{-1})^{-1}\{\rho\}^{-1}[[x]]$

[[Conversion]]
1. Native substitution →index substitution: $\{\pi\}[[I]]=[[\pi]]$
2. Index substitution →native substitution: via hybrid substitution.
3. Native substitution →hybrid substitution: $(\{\pi\}, I)$
4. Hybrid substitution →native substitution: synthesize $\rho^{-1}\pi$ with $\{\rho\}_{20}^{01,12,20}$ of $\{\rho\}^{01,12,20}$.
5. Index substitution→hybrid substitution: $\{\{\pi\}\}[[I]]=\{\{\pi\}\}$
6. Hybrid substitution →index substitution: $\{\{\pi\}\}[[I]]=[[\pi]]$

[[Synthesis]]
1. Index substitution and native substitution: $\{\{\rho\}\}[[\pi]]=[[\rho\pi]]$
2. Index substitution and hybrid substitution: $\{\{\rho\}\}[[\pi]]$
3. Other combinations are performed via index substitution.

First Embodiment

As shown in FIG. 1, a confidential sort system according to a first embodiment is provided with, for example, a first apparatus 1, a second apparatus 2, . . . , and an Mth apparatus M. M is a predetermined positive integer of 2 or more. In this example, there are M parties and the M parties are the first apparatus 1, the second apparatus 2, . . . , and the Mth apparatus M.

A confidential sort method of the first embodiment is implemented, for example, by the first apparatus 1, the second apparatus 2, . . . , and the Mth apparatus M executing processes under Scheme 4-1 in FIG. 2 and Scheme 4-2 in FIG. 3. Hereinafter, when there is a mention "the first apparatus 1, the second apparatus 2, . . . , and the Mth apparatus M perform ○○," this means that the first apparatus 1, the second apparatus 2, . . . , and the Mth apparatus M jointly perform ○○ through secret calculation. Of course, when a process of ○○ does not require secret calculation, the first apparatus 1, the second apparatus 2, . . . , and the Mth apparatus M need not perform secret calculation.

The first apparatus 1, the second apparatus 2, . . . , and the Mth apparatus M perform a process under Scheme 4-1 shown in FIG. 2 and thereby perform a confidential sort process on a key first.

In "1:" under Scheme 4-1, the first, second, ..., and Mth apparatuses obtain inverse substitution $[[\sigma_0^{-1}]]$ of L-bit stable sort of $\{\vec{k}_0\}$ ("1:" under Scheme 4-1). Here, it is assumed that a bit length of a key is L', L is a predetermined positive integer, N is a positive integer satisfying NL=L' and an (n+1)th (n=0, ..., N-1) bit string when the key is divided into bit strings having a bit length L is $\vec{k}_n$. Inverse substitution of the L-bit stable sort can be performed under Scheme 3-1 in FIG. 4 and Scheme 3-2 in FIG. 5. In FIG. 4 and FIG. 5, $[[k]]^{(Z\_2)\wedge L}=([[k_0]]^{Z\_2}, [[k_1]]^{Z\_2}, \ldots, [[K_{L-1}]]^{Z\_2})$ and $[[f]]^{(Z\_q)\wedge(2\wedge L)}=([[f_0]]^{Z\_q}, [[f_1]]^{Z\_q}, \ldots, [[f_{(2[<]BEGINITALmL)-1)}]]^{Z\_q})$. "$(f_j)_i$" represents an ith element of a vector j. Reference character m denotes the number of elements of a vector to be sorted and substituted as described above. More specifically, m in FIG. 4 is the number of elements of $k_j$ and m in FIG. 5 is the number of elements of $f_j$.

In FIG. 4, mod 2→mod q conversion can be performed, for example, under Scheme 3-3 in FIG. 13. "reveal( )" in FIG. 13 represents reconstructing and publicly disclosing a secret variance in parentheses of reveal.

In "2:" to [6:] under Scheme 4-1, the first, second, ..., and Mth apparatuses perform processes from "3:" to "6:" under Scheme 4-1 on each i=1, ..., N.

That is, the first, second, ..., and Mth apparatuses convert $[[\sigma_{i-1}^{-1}]]$ to hybrid substitution to obtain $\{\sigma_{i-1}^{-1}\}$ assuming i=1, ..., N-1 ("3:" under Scheme 4-1).

The first, second, ..., and Mth apparatuses inversely substitute $\{\vec{k}_i\}$ with $\{\sigma_{i-1}^{-1}\}$ to obtain $\{\sigma_{i-1}\vec{k}_i\}$ assuming i=1, ..., N-1 ("4:" under Scheme 4-1).

The first, second, ..., and Mth apparatuses obtain inverse substitution $[[\sigma'_i^{-1}]]$ of the L-bit stable sort of $[[\sigma_{i-1}\vec{k}_i]]$ assuming i=1, ..., N-1 ("5:" under Scheme 4-1).

The first apparatus 1, the second apparatus 2, ..., and the Mth apparatus M synthesize $\{\sigma_{i-1}^{-1}\}$ with $[[\sigma'_i^{-1}]]$ to obtain $[[\sigma_i^{-1}]]:=[[\sigma_{i-1}^{-1}\sigma'_i^{-1}]]$ assuming i=1, ..., N-1 ("6:" under Scheme 4-1).

In "7:" under Scheme 4-1, the first, second, ..., and Mth apparatuses convert $[[\sigma_{N-1}^{-1}]]$ to hybrid substitution to obtain $\{\sigma_{N-1}^{-1}\}$ ("7:" under Scheme 4-1).

Next, the first apparatus 1, the second apparatus 2, ..., and the Mth apparatus M perform a process under Scheme 4-2 shown in FIG. 3 and thereby perform a confidential sort process on a value.

That is, the first apparatus 1, the second apparatus 2, ..., and the Mth apparatus M inversely substitute $[[\vec{v}]]$ with $\{\sigma_{N-1}^{-1}\}$ in "1:" under Scheme 4-2 shown in FIG. 3 and output $[[\sigma_{N-1}\vec{v}]]$ ("1:" under Scheme 4-2). "$\vec{v}$" is the value which is the body of data to be sorted.

In this way, using inverse substitution, it is possible to simplify the algorithm of confidential sort compared to the prior art. This allows a confidential sort to be performed faster than in the prior art.

Note that when the secret calculation of the first embodiment is performed in a so-called passive (security at which an attacker may peep but not perform any illegal process) version, it is possible to use a Shamir secret variance or replicated secret variance.

When a Shamir secret variance is used, the method described in Reference Document 4 (e.g., 2.5, Shuffling Protocol) may be used to perform random substitution and inverse substitution. The method described in Reference Document 5 may be used to perform public disclosure. Public value output random substitution may be publicly disclosed using the method described in Reference Document 5 after performing random substitution using the method described in Reference Document 4. Addition, multiplication and product sum operations may be performed using the method described in Reference Document 6 (e.g., The Computation Stage). An L-bit stable sort may be performed using the method described in Reference Document 2 (e.g., Schemes 6+7).

When a replicated secret variance is used, random substitution and inverse substitution may be performed using the method described in Reference Document 4 (e.g., 2.5, Shuffling Protocol). Public disclosure may be performed using the method described in Reference Document 7 (e.g., cramer 2005, 2. Preliminaries, 2. Replicated Secret-sharing). Public value output random substitution may be publicly disclosed using the method described in Reference Document 7 after performing random substitution using the method described in Reference Document 4. Addition, multiplication and product sum operations may be performed using the method described in Reference Document 8 (e.g., protocols 1 and 7). An L-bit stable sort may be performed using the method described in Reference Document 2 (e.g., Schemes 6+7).

When performing secret calculation of the first embodiment using a so-called active (safe even when an attacker performs an illegal process) version, a Shamir secret variance can be used.

In the case of performing secret calculation of the first embodiment in the active version, if a Shamir secret variance is used, random substitution and inverse substitution may be performed using the method described in Reference Document 9 (e.g., Scheme 6). Public disclosure may be performed using the method described in Reference Document 10 (e.g., Scheme 12). Public value output random substitution may be publicly disclosed using the method described in Reference Document 10 after performing random substitution using the method described in Reference Document 9. Addition, multiplication and product sum operations may be performed using the method described in Reference Document 9 (e.g., Schemes 3 to 5). An L-bit stable sort may be performed using the method described in Reference Document 2 (e.g., Schemes 6+7).

Reference Document 4

Koki Hamada, Ryo Kikuchi, Dai Ikarashi, Koji Chida, Katsumi Takahashi, "Practically Efficient Multi-party Sorting Protocols from Comparison Sort Algorithms", ICISC 2012: 202-216

Reference Document 5

Adi Shamir, "How to Share a Secret", Commun. ACM 22(11): 612-613 (1979)

Reference Document 6

Michael Ben-Or, Shafi Goldwasser, Avi Wigderson, "Completeness Theorems for Non-Cryptographic Fault-Tolerant Distributed Computation (Extended Abstract)", STOC 1988: 1-10

Reference Document 7

Ronald Cramer, Ivan Damgard, Yuval Ishai, "Share Conversion, Pseudorandom Secret-Sharing and Applications to Secure Computation", TCC 2005: 342-362

Reference Document 8

Dai Ikarashi, Koji Chida, Koki Hamada, Katsumi Takahashi, "Secure Database Operations Using An Improved 3-party Verifiable Secure Function Evaluation."

Reference Document 9

Dai Ikarashi, Ryo Kikuchi, Koki Hamada, Koji Chida, "An Unconditionally Private and Correct MPC Construction against the Active Adversary on Multiple Fields and an Application to Fast Secure Sorting", In SCIS2015, 2015.

Reference Document 10

D. Ikarashi, R. Kikuchi, K. Hamada, and K. Chida, "Actively private and correct MPC scheme in t<n/2 from passively secure schemes with small overhead", IACR Cryptology ePrint Archive, 2014: 304, 2014.

Second Embodiment

Figure 6:
FIG. 6 is a block diagram illustrating an example of a confidential sort system according to a second embodiment.

As shown in FIG. 6, a second embodiment is provided with, for example, a first apparatus 1, a second apparatus 2 and a third apparatus 3. In this example, there are three parties, and the three parties are the first apparatus 1, the second apparatus 2 and the third apparatus M respectively.

A confidential sort method according to the second embodiment is implemented, for example, by the first apparatus 1, the second apparatus 2 and the third apparatus 3 performing respective processes under Scheme 5 in FIG. 7 and Scheme 5-3 in FIG. 8. Hereinafter, when there is a mention "the first apparatus 1, the second apparatus 2 and the third apparatus 3 perform ○○," this means that the first apparatus 1, the second apparatus 2 and the third apparatus 3 jointly perform ○○ through secret calculation. Of course, when the process of ○○ does not require secret calculation, the first apparatus 1, the second apparatus 2 and the third apparatus 3 need not perform secret calculation.

First, the first apparatus 1, the second apparatus 2 and the third apparatus 3 perform a process under Scheme 5 shown in FIG. 7 and thereby perform a confidential sort process on a key first.

In "1:" under Scheme 5, the first apparatus, the second apparatus and the third apparatus 3 perform the process under Scheme 5-1 on $\{\vec{k}_0\}^{(Z\_2)\wedge L}$ and thereby obtain $\{\sigma_0^{-1}\}=(<\pi\sigma_0^{-1}>^{20}, \{\pi\}^{01,12})$ ("1:" under Scheme 5).

Here, assuming that i=0, . . . , N−1, $\{\vec{k}_i\}^{(Z\_2)\wedge L}=(\{\vec{k}_{i,0}\}^{Z\_2}, \{\vec{k}_{i,1}\}^{Z\_2}, \ldots \{\vec{k}_{i, L-1}\}^{Z\_2})$. It is also assumed that a bit length of a key is L', L is a predetermined positive integer, N is a positive integer satisfying NL=L', and an (n+1)th (n=0, . . . , N−1) bit string when the key is divided into bit strings having a bit length L is $\vec{k}_n$.

In "2:" and "3:" under Scheme 5, the first apparatus, the second apparatus and the third apparatus 3 perform a process under Scheme 5-2 on $\{\vec{k}_i\}^{(Z\_2)\wedge L}$ for i=0, . . . , N−1 to finally obtain $\{\sigma_{N-1}^{-1}\}=(<\pi\sigma_{N-1}^{-1}>^{20}, \{\pi\}^{01,12})$ ("2:" and "3:" under Scheme 5).

Next, the first apparatus 1, the second apparatus 2 and the third apparatus 3 perform a process under Scheme 5-3 shown in FIG. 8 and thereby perform a confidential sort process on a value.

That is, the first apparatus 1, the second apparatus 2 and the third apparatus 3 inversely substitute [[$\vec{v}$]] with $\{\sigma_{N-1}^{-1}\}$ in "1:" under Scheme 5-3 shown in FIG. 8 and output [[$\sigma_{N-1}\vec{v}$]] ("1:" under Scheme 5-3). "$\vec{v}$" is the value which is the body of data to be sorted.

Hereinafter, Scheme 5-1 in FIG. 9 and FIG. 10 will be described.

In "1:" under Scheme 5-1, the first apparatus, the second apparatus and the third apparatus 3 convert $\{\vec{k}_{0,0}\}^{Z\_2}, \{\vec{k}_{0,1}\}^{Z\_2}, \ldots, \{\vec{k}_{0, L-1}\}^{Z\_2}$ to [[$\vec{k}_{0,0}$]]$^{Z\_q}$, [[$\vec{k}_{0,1}$]]$^{Z\_q}$, . . . , [[$\vec{k}_{0, L-1}$]]$^{Z\_q}$ through mod 2 mod q conversion ("1:" under Scheme 5). Here, q is assumed to be a predetermined positive integer. A mod 2→mod q conversion can be performed under Scheme 3-3 in FIG. 13.

In "2:" to "5:" under Scheme 5-1, the first apparatus, the second apparatus and the third apparatus 3 calculate [[$K_D$]]:=[[$\Pi_{w\in D}\vec{k}_{0,w}$]]$^{Z\_q}$ for each set of a positive integer $\eta$ satisfying $\eta<\lceil\log L\rceil$ and D satisfying $D\subseteq Z_L$ and $2^{\eta}+1\leq|D|\leq\min(2^{\eta+1}, L)$ ("2:" to "5:" under Scheme 5). Here, assuming that $x^A$ is an arbitrary real number, $\lceil x^A \rceil$ is a ceiling function. That is, $\lceil x^A \rceil$ represents a minimum integer of $x^A$ or more for the real number $x^A$. Here, ":=" has the same meaning as "=".

In "6:" to "8:" under Scheme 5-1, the first apparatus, the second apparatus and the third apparatus 3 perform a process of calculating [[$\vec{f}_j$]]$^{Z\_q}$:=$\Pi_{j<L}$[[$\vec{k}'_{0,w}$]] for each j where $j<2^L$ ("6:" to "8:" under Scheme 5-1). Here, assuming that a wth bit of bit expression of j is $j_w$, $\vec{k}'_{0,w}$ is $\vec{k}'_{0,w}=1-\vec{k}_{0,w}$ when $j_w=0$ and $\vec{k}'_{0,w}=\vec{k}_{0,w}$ when $j_w=1$.

In "9:" under Scheme 5-1, the first apparatus, the second apparatus and the third apparatus 3 perform a process of calculating [[$(\vec{f}_j)_u$]]$^{Z\_q}$:=$\Sigma_{0\leq t<u}$[[$(\vec{f}_j)_t$]]$^{Z\_q}$+[[$s_j$]]$^{Z\_q}$ ("9:" under Scheme 5-1). Here, it is assumed that an arbitrary vector is $\vec{f}^A$, $(\vec{f}^A)_u$ is a uth element of the vector $\vec{f}^A$, $s_0:=0$, $s_j:=\Sigma_{0\leq u<m}(\vec{f}_{j-1})_u+s_{j-1}$ for j=1, . . . , 3, and the number of elements of vector $\vec{f}_{j-1}$ is m.

In "10:" under Scheme 5-1, the first apparatus, the second apparatus and the third apparatus 3 perform a process of calculating $[\sigma_0^{-1}]^{Z\_q,01}$:=$\Sigma_{0\leq j<2\wedge L}[\vec{f}_j\vec{f}_j]^{Z\_q,01}$ using (2,2) output product sum ("10:" under Scheme 5-1). The (2,2) output product sum can be calculated under Scheme 5-4 in FIG. 14, for example. The (2,2) output product sum is a product sum process to obtain an output in a (2,2)-additive secret variance format.

In "11:" under Scheme 5-1, a process of calculating $<\pi\sigma_0^{-1}>^{20}$:=$\{\pi\}^{01,12}[(\sigma_0^{-1}]^{Z\_q,01}$ is performed ("11:" under Scheme 5-1). Here, $<\pi\sigma_i^{-1}>^{20}$ represents that $\pi\sigma_i^{-1}$ is shared by the third apparatus and the first apparatus. The process in "11:" under Scheme 5-1 can be implemented by performing a process under Scheme 5-5 in FIG. 15.

Hereinafter, Scheme 5-2 in FIG. 11 and FIG. 12 will be described.

In "1:" under Scheme 5-2, the first, second and third apparatuses perform a process of converting $\{\vec{k}_{i,0}\}^{Z\_2}, \{\vec{k}_{i,1}\}^{Z\_2}, \ldots, \{\vec{k}_{i, L-1}\}^{Z\_2}$ to (2,2) additive secret variance $[\vec{k}_{i,0}]^{Z\_2,01}, [\vec{k}_{i,1}]^{Z\_2,01}, \ldots, [\vec{k}_{i, L-1}]^{Z\_2,01}$ ("1:" under Scheme 5-2).

In "2:" under Scheme 5-2, the first, second and third apparatuses perform a process of obtaining $[\vec{b}_0]^{Z\_2,20}$:=$[\sigma_{i-1}\vec{k}_{i,0}]^{Z\_2,20}$, $[\vec{b}_1]^{Z\_2,20}$:=$[\sigma_{i-1}\vec{k}_{i,1}]^{Z\_2,20}$, . . . , $[\vec{b}_{L-1}]^{Z\_2,20}$:=$[\sigma_{i-1}\vec{k}_{i, L-1}]^{Z\_2,20}$ by inversely applying $\{\sigma_{i-1}^{-1}\}$ to $[\vec{k}_{i,0}]^{Z\_2,01}, [\vec{k}_{i,1}]^{Z\_2,01} \ldots, [\vec{k}_{i, L-1}]^{Z\_2,01}$ ("2:" under Scheme 5-2).

In "3:" under Scheme 5-2, the first, second and third apparatuses perform a process of converting, $[\vec{b}_0]^{Z\_2,20}$, $[\vec{b}_1]^{Z\_2,20}$, . . . , $[\vec{b}_{L-1}]^{Z\_2,20}$ to [[$\vec{b}_0$]]$^{Z\_q}$, [[$\vec{b}_1$]]$^{Z\_q}$, . . . , [[$\vec{b}_{L-1}$]]$^{Z\_q}$ through mod 2→mod q conversion ("3:" under Scheme 5-2).

In "4:" to "7:" under Scheme 5-2, the first, second and third apparatuses perform a process of calculating [[$K_D$]]:= [[$\Pi_{w\in D}\vec{k}_{0,w}$]]$^{Z\_q}$ on each set of a positive integer $\eta$ satisfying $\eta<\lceil F\log L\rceil$ and D satisfying $D\subseteq Z_L$ and $2^{\eta}1\leq|D|\leq\min(2^{\eta+1}, L)$ ("4:" to "7:" under Scheme 5-2).

In "8:" to "10:" under Scheme 5-2, the first, second and third apparatuses perform a process of calculating $[[\vec{f}_j]]^{Z-q} := \Pi_{j<1}, [[\vec{k}'_{i,w}]]$ for each j where $j<2^L$ ("8:" to "10:" under Scheme 5-2). Here, it is assumed that the wth bit of bit expression of j is $j_w$, $\vec{k}'_{i,w}$ is $\vec{k}'_{i,w} = 1 - \vec{k}_{i,w}$ when $j_w = 0$ and $\vec{k}'_{i,w} = \vec{k}_{i,w}$ when $j_w = 1$.

In "11:" under Scheme 5-2, the first, second and third apparatuses perform a process of calculating $[[(\vec{f}_j)_u]]^{Z-q} := \Sigma_{0 \leq t < u}[[(\vec{f}_j)_t]]^{Z-q} + [[s_j]]^{Z-q}$ ("11:" under Scheme 5-2).

In "12:" under Scheme 5-2, the first, second and third apparatuses perform a process of calculating $[\sigma'^{-1}]^{Z-q,20} := \Sigma_{0 \leq j < 2 \wedge L}[\vec{f}_j \vec{f}_j]^{Z-q,20}$ through (2,2) output product sum ("11:" under Scheme 5-2).

In "13:" under Scheme 5-2, the first, second and third apparatuses perform a process of obtaining $[\sigma^{-1}]^{Z-q,01} := [(\sigma_{i-1}^{-1} \sigma'^{-1}]^{Z-q,01}$ by applying $\{\sigma_{i-1}^{-1}\}$ to $[\sigma^{-1}]^{Z-q,20}$ ("13:" under Scheme 5-2).

In "14:" under Scheme 5-2, the first, second and third apparatuses perform a process of calculating $<\pi\sigma_i^{-1}>^{20} := \{\pi\}^{01,12}[\sigma^{-1}]^{Z-q,01}$ ("14:" under Scheme 5-2). Note that the process in "14:" under Scheme 5-2 can be implemented by performing a process under Scheme 5-5 in FIG. 15.

Note that in the case of L=2, Scheme 5-1 and Scheme 5-2 become Scheme 5-1 and Scheme 5-2 described in FIG. 16, FIG. 17 and FIG. 18 respectively.

Using inverse substitution in this way, it is possible to make the algorithm of confidential sort simpler than in the prior art. This allows confidential sort to be performed faster than in the prior art.

[Modifications]

As will be described below, optimization using communication channels may be used. In other words, the communication channels may be effectively used so that there are as few empty communication channels as possible.

For example, the process of mod 2 to mod q in "3:" the process of multiplication in "4:" and the process of (2,2) output product sum in "7:" under Scheme 5-1 and Scheme 5-2 in FIG. 16, FIG. 17 and FIG. 18 have a degree of freedom in communication directions. These processes may be performed by effectively using the communication channels so that there are as few empty communication channels as possible.

When L' is not a multiple of L, the key having length L' may be divided so that $NL + L'' = L'$. The key having length L' may be divided so that $\Sigma_{i=0}^{N-1} L_i = L'$. In this case, for example, $\vec{k}_n$ becomes a vector constructed of an (n+1)th (n=0, ..., N−1) bit string when the key having length L' is divided so that $\Sigma_{i=0}^{N-1} L_i = L'$. In this way, N may be assumed to be a predetermined positive integer and the (n+1)th (n=0, ..., N−1) bit string when the key is divided into N bit strings may be assumed to be $\vec{k}_n$.

In addition, it goes without saying that changes can be made as appropriate without departing from the spirit and scope of the present invention.

[Program and Recording Medium]

When, for example, a process in each apparatus is implemented by a computer, process contents of a function that should be possessed by each part of each apparatus are written by a program. By causing a computer to execute this program, processes of the respective apparatus are implemented on the computer.

The program in which the process contents are written can be recorded in a computer-readable recording medium. As the computer-readable recording medium, any magnetic recording apparatus, optical disk, magnetooptical recording medium, semiconductor memory or the like may be used.

Processes of the respective parts may be configured by causing a predetermined program to be executed on a computer or at least some of the processes may be implemented by hardware.

What is claimed is:

1. A confidential sort system comprising:

first, second, ..., and third apparatuses that each include processing circuitry and communicate with each over a network, wherein assuming that a body of data to be sorted is a value $\vec{v}$, a tag that determines order after the sort is a key, a bit length of the key is L', N is a predetermined positive integer, an (n+1)th (n=0, ..., N−1) bit string when the key is divided into N bit strings is $\vec{k}_n$, an arbitrary value or substitution is $x^A$, $\{x^A\}$ is a replicated secret variance of $x^A$, an arbitrary value is $x^A$, $[[x^A]]$ is a secret variance having homomorphism of $x^A$, and M is a predetermined positive integer of 2 or more, the first, second, ..., and Mth apparatuses obtain inverse substitution $[[\sigma_0^{-1}]]$ of L-bit stable sort of $\{\vec{k}_0\}$, the first, second, ..., and Mth apparatuses perform the following processes through secret calculation, on i=1, ..., N−1:

a process of obtaining $\{\sigma_{i-1}^{-1}\}$ by converting $[[\sigma_{i-1}^{-1}]]$ to hybrid substitution;

a process of obtaining $\{\sigma_{i-1}\vec{k}_i\}$ by inversely substituting $\{\vec{k}_i\}$ using $\{\sigma_{i-1}^{-1}\}$;

a process of obtaining inverse substitution $[[\sigma'_i^{-1}]]$ of L-bit stable sort of $[[\sigma_{i-1}\vec{k}_i]]$;

a process of obtaining $[[\sigma_i^{-1}]] := [[\sigma_{i-1}^{-1} \sigma'_i^{-1}]]$ by synthesizing $\{\sigma_{i-1}^{-1}\}$ with $[[\sigma'_i^{-1}]]$; and a process of obtaining $\{\sigma_{N-1}^{-1}\}$ by converting $[[\sigma_{N-1}^{-1}]]$ to hybrid substitution, and the first, second, ..., and third apparatuses output $[[\sigma_{N-1}\vec{v}]]$ by inversely substituting $[[\vec{v}]]$ using $\{\sigma_{N-1}^{-1}\}$, wherein the processes are performed while concealing original data $\sigma_{i-1}^{-1}$, $\sigma'_i^{-1}$, $\sigma_{i-1}\vec{k}_i$, $\sigma_{i-1}^{-1}\sigma'_i^{-1}$, $\sigma_{N-1}^{-1}$, $\vec{v}$, and $\sigma_{N-1}\vec{v}$ from each of the first, second, ..., and Mth apparatuses.

2. A confidential sort system comprising:

first, second, ..., and Mth apparatuses that each include processing circuitry and communicate with each over a network, wherein assuming that a body of data to be sorted is a value $\vec{v}$, a tag that determines order after the sort is a key, a bit length of the key is L', N is a predetermined positive integer, an (n+1)th (n=0, ..., N−1) bit string when the key is divided into N bit strings is $\vec{k}_n$, an arbitrary value or substitution is $x^A$, $\{x^A\}$ is a replicated secret variance of $x^A$, an arbitrary value is $x^A$, $[[x^A]]$ is a secret variance having homomorphism of $x^A$, $<x^A>$ is a semi-public value, $[x^A]$ is a (2,2) additive secret variance, $\{\vec{k}_j\}^{(Z-2) \wedge L} = (\{\vec{k}_{i,0}\}^{Z-2}, \{\vec{k}_{i,1}\}^{Z-2}, \ldots, \{\vec{k}_{i,L-1}\}^{Z-2})$ (i=0 ..., N−1), q is a predetermined positive integer, $(\vec{f}^A)_u$ is a uth element of vector $\vec{f}^A$ where $\vec{f}^A$ is an arbitrary vector, $s_0 := 0$, $s_j := \Sigma_{0 \leq u < m} (\vec{f}_{j-1})_u + s_{j-1}$ for j=1, ..., 3, the number of elements of vector $\vec{f}_{j-1}$ is m, 01 represents a set of the first and second apparatuses, 12 represents a set of the second and third apparatuses, 20 represents a set of the third and first apparatuses, G is an arbitrary group, ring or body, P is a set of apparatuses, $[x^A]^{G,P}$ represents a share of $[x^A]$ represented on G of P, $\pi$ is predetermined substitution, $\{\pi\}_P$ means a sub-share of $\{\pi\}$ shared by P, $\{\pi\}^{01,12}$ represents a replicated secret variance in which $\pi=\{\pi\}_{12}\{\pi\}_{01}$, and $<\pi\sigma_i^{-1}>^{20}$ shows that $\pi\alpha_i^{-1}$ is shared by the third and first apparatuses, the first, second and third apparatuses perform the following processes through secret calculation:

a process of converting, through mod 2→mod q conversion, $\{\vec{k}_{0,0}\}^{Z\_2}, \{\vec{k}_{0,1}\}^{Z\_2}, \ldots, \{\vec{k}_{0,L-1}\}^{Z\_2}$ to $[[\vec{k}_{0,0}]]^{Z\_q}, [[\vec{k}_{0,1}]]^{Z\_q}, \ldots, [[\vec{k}_{0,L-1}]]^{Z\_q}$;

a process of calculating $[[K_D]]:=[[\Pi_{w\in D}\vec{k}_{0,w}]]^{Z\_q}$ for each set of a positive integer η satisfying η<⌈log L⌉ and D satisfying $D\subseteq Z_L$ and $2^{\eta}+1\leq|D|\leq\min(2^{\eta+1}, L)$;

a process of calculating $[[\vec{f}_j]]^{Z\_q}:=\Pi_{j<L}[[\vec{k'}_{0,w}]]$ for each j where $j<2^L$ assuming the wth bit of bit expression of j as $j_w$ and $\vec{k'}_{0,w}$ is $\vec{k'}_{0,w}=1-\vec{k}_{0,w}$ when $j_w=0$ and $\vec{k'}_{0,w}=\vec{k}_{0,w}$ when $j_w=1$;

a process of calculating $[[(\vec{f}_j)_u]]^{Z\_q}:=\Sigma_{0\leq y<u}[[(\vec{f}_j)_t]]^{Z\_q}+[[s_j]]^{Z\_q}$;

a process of calculating $[\sigma_0^{-1}]^{Z\_q,01}:=\Sigma_{0\leq j<2\wedge L}[\vec{f}_j\vec{f}_j]^{Z\_q,01}$ through (2,2) output product sum operation; and a process of calculating $<\pi\sigma_0^{-1}>^{20}:=\{\pi\}^{01,12}[\sigma_0^{-1}]^{Z\_q,01}$, the first, second and third apparatuses perform:

a process of converting $\{\vec{k}_{i,0}\}^{Z\_2}, \{\vec{k}_{i,1}\}^{Z\_2}, \ldots, \{\vec{k}_{i,L-1}\}^{Z\_2}$ to (2,2) additive secret variance $[\vec{k}_{i,0}]^{Z\_2,01}, [\vec{k}_{i,1}]^{Z\_2,01}, \ldots, [\vec{k}_{i,L-1}]^{Z\_2,01}$ assuming $i=1, \ldots, N-1$;

a process of inversely applying $\{\sigma_{i-1}^{-1}\}$ to $[\vec{k}_{i,0}]^{Z\_2,01}, [\vec{k}_{i,1}]^{Z\_2,01}, \ldots, [\vec{k}_{i,L-1}]^{Z\_2,01}$ to obtain $[\vec{b}_0]^{Z\_2,20}:=[\sigma_{i-1}\vec{k}_{i,0}]^{Z\_2,20}, [\vec{b}_1]^{Z\_2,20}:=[\sigma_{i-1}\vec{k}_{i,1}]^{Z\_2,20}, \ldots, [\vec{b}_{L-1}]^{Z\_2,20}:=[\sigma_{i-1}\vec{k}_{i,L-1}]^{Z\_2,20}$;

a process of converting $[\vec{b}_0]^{Z\_2,20}, [\vec{b}_1]^{Z\_2,20}, \ldots, [\vec{b}_{L-1}]^{Z\_2,20}$ to $[[\vec{b}_0]]^{Z\_q}, [[\vec{b}_1]]^{Z\_q}, \ldots, [\vec{b}_{L-1}]^{Z\_q}$ through mod 2→mod q conversion;

a process of calculating $[[K_D]]:=[[\Pi_{w\in D}\vec{k}_{0,w}]]^{Z\_q}$ for each set of a positive integer η satisfying η<⌈Πlog L⌉ and D satisfying $D\subseteq Z_L$ and $2^{\eta}+1\leq|D|\leq\min(2^{\eta}, L)$;

a process of calculating $[[\vec{f}_j]]^{Z\_q}:=\Pi_{j<L}[[\vec{k'}_{i,w}]]$ for each j where $j<2^L$ assuming the wth bit of bit expression of j is $j_w$, $\vec{k'}_{i,w}$ is $\vec{k'}_{i,w}=1-\vec{k}_{i,w}$ when $j_w=0$ and $\vec{k'}_{i,w}=\vec{k}_{i,w}$ when $j_w=1$;

a process of calculating $[[(\vec{f}_j)_u]]^{Z\_q}:=\Sigma_{0\leq t<u}[[(\vec{f}_j)_t]]^{Z\_q}+[[s_j]]^{Z\_q}$;

a process of calculating $[\sigma'^{-1}]^{Z\_q,20}:=\Sigma_{0\leq j<2\wedge L}[\vec{f}_j\vec{f}_j]^{Z\_q,20}$ through (2,2) output product-sum operation;

a process of applying $\{\sigma_{i-1}^{-1}\}$ to $[\sigma^{-1}]^{Z\_q,20}$ to obtain $[\sigma^{-1}]^{Z\_q,01}:=[\sigma_{i-1}^{-1}\sigma'^{-1}]^{Z\_q,01}$; and a process of calculating $<\pi\sigma_i^{-1}>^{20}:=\{\pi\}^{01,12}[\sigma^{-1}]^{Z\_q,01}$ on $i=1, \ldots, N-1$, and a process of inversely substituting $[[\vec{v}]]$ with $\{\sigma^{-1}\}$ assuming that $\{\sigma^{-1}\}=(<\pi\sigma_{N-1}^{-1}>^{20}, \{\pi\}^{01,12})$ and output $[[\sigma\vec{v}]]$, wherein the processes are performed while concealing original data $\vec{k}_{0,0}, \vec{k}_{0,1}, \ldots, \vec{k}_{0,L-1}$; $K_D$; $\Pi_{w\in D}\vec{k}_0$; $\vec{f}_j$; $\vec{k'}_{0,w}$; $(\vec{f}_j)$; $s_j$; $\vec{b}_0, \vec{b}_1, \ldots, \vec{b}_{L-1}$; $\vec{f}$; $\vec{k'}_{j,w}$; $(\vec{f}_j)_u$; $(\vec{f}_j)_t$; $(\vec{f}_j)_i$; $\vec{v}$: $\sigma\vec{v}$ from each of the first, second, and third apparatuses.

3. A confidential sort method based on assumption that a body of data to be sorted is a value $\vec{v}$, a tag that determines order after the sort is a key, a bit length of the key is L', N is a predetermined positive integer, an (n+1)th (n=0, ..., N−1) bit string when the key is divided into N bit strings is $\vec{k}_n$, an arbitrary value or substitution is $x^A$, $\{x^A\}$ is a replicated secret variance of $x^A$, an arbitrary value is $x^A$, $[[x^A]]$ is a secret variance having homomorphism of $x^A$, and M is a predetermined positive integer of 2 or more, the method comprising:

a step in which first, second, ..., and Mth apparatuses, that each include processing circuitry and communicate with each over a network, obtain inverse substitution $[[\sigma_0^{-1}]]$ of L-bit stable sort of $\{\vec{k}0\}$, a step in which the first, second, ..., and Mth apparatuses perform the following processes through secret calculation, on $i=1, \ldots, N-1$:

a process of obtaining $\{\sigma_{i-1}^{-1}\}$ by converting $[[\sigma_{i-1}^{-1}]]$ to hybrid substitution;

a process of obtaining $\{\sigma_{i-1}\vec{k}_i\}$ by inversely substituting $\{\vec{k}_i\}$ using $\{\sigma_{i-1}^{-1}\}$;

a process of obtaining inverse substitution $[[\sigma_i'^{-1}]]$ of L-bit stable sort of $[[\sigma_{i-1}\vec{k}_i]]$;

a process of obtaining $[[\sigma_{N-1}]]:=[[\sigma_{i-1}^{-1}\sigma_i'^{-1}]]$ by synthesizing $\{\sigma_{i-1}^{-1}\}$ with $[[\sigma_i'^{-1}]]$; and a process of obtaining $\{\sigma_{N-1}^{-1}\}$ by converting $[[\sigma_{N-1}^{-1}]]$ to hybrid substitution, and a step in which the first, second, ..., and Mth apparatuses output $[[\sigma_{N-1}\vec{v}]]$ by inversely substituting $[[\vec{v}]]$ using $\{\sigma_{N-1}^{-1}\}$, wherein the processes are performed while concealing original data $\sigma_{i-1}^{-1}, \sigma_i'^{-1}, \sigma_{i-1}\vec{k}_i, \sigma_{i-1}^{-1}\sigma_i'^{-1}, \sigma_{N-1}^{-1}, \vec{v},$ and $\sigma_{N-1}\vec{v}$ from each of the first, second, ..., and Mth apparatuses.

4. A confidential sort method in a system including first, second, ..., and third apparatuses that each include processing circuitry and communicate with each over a network, wherein based on assumption that a body of data to be sorted is a value $\vec{v}$, a tag that determines order after the sort is a key, a bit length of the key is L', N is a predetermined positive integer, an (n+1)th (n=0, ..., N−1) bit string when the key is divided into N bit strings is $\vec{k}_n$, an arbitrary value or substitution is $x^A$, $\{x^A\}$ is a replicated secret variance of $x^A$, an arbitrary value is $x^A$, $[[x^A]]$ is a secret variance having homomorphism of $x^A$, $<x^A>$ is a semi-public value, $[x^A]$ is a (2,2) additive secret variance, $\{\vec{k}_i\}^{(Z\_2)\wedge L}=(\{\vec{k}_{i,0}\}^{Z\_2}, \{\vec{k}_{i,1}\}^{Z\_2}, \ldots, \{\vec{k}_{i,L-1}\}^{Z\_2})$ (i=0, ..., N−1), q is a predetermined positive integer, $(\vec{f}^A)_u$ is a uth element of vector $\vec{f}^A$ where $\vec{f}^A$ is an arbitrary vector, $s_0:=0$, $s_j:=\Sigma_{0\leq u<m}(\vec{f}_{j-1})_u+s_{j-1}$ for $j=1, \ldots, 3$, the number of elements of vector $\vec{f}_{j-1}$ is m, 01 represents a set of the first and second apparatuses, 12 represents a set of the second and third apparatuses, 20 represents a set of the third and first apparatuses, G is an arbitrary group, ring or body, P is a set of apparatuses, $[x^A]^{G,P}$ represents a share of $[x^A]$ represented on G of P, π is predetermined substitution, $\{\pi\}_P$ means a sub-share of $\{\pi\}$ shared by P, $\{\pi\}^{01,12}$ represents a replicated secret variance in which $\pi=\{\pi\}_{12}\{\pi\}_{01}$, and $<\pi\sigma_i^{-1}>^{20}$ shows that $\pi\sigma_i^{-1}$ is shared by the third and first apparatuses, the method comprising:

a step in which the first, second and third apparatuses perform the following processes through secret calculation:

a process of converting, through mod 2→mod q conversion, $\{\vec{k}_{0,0}\}^{Z\_2}, \{\vec{k}_{0,1}\}^{Z\_2}, \ldots, \{\vec{k}_{0,L-1}\}^{Z\_2}$ to $[[\vec{k}_{0,0}]]^{Z\_q}, [[\vec{k}_{0,1}]]^{Z\_q}, \ldots, [[\vec{k}_{0,L-1}]]^{Z\_q}$;

a process of calculating $[[K_D]]:=[[\Pi_{w\in D}\vec{k}_{0,w}]]^{Z\_q}$ for each set of a positive integer η satisfying η<⌈log L⌉ and D satisfying $D\subseteq Z_L$ and $2^{\eta}+1\leq|D|\leq\min(2^{\eta+1}, L)$;

a process of calculating $[[\vec{f}_j]]^{Z\_q}:=\Pi_{j<L}[[\vec{k'}_{0,w}]]$ for each j where $j<2^L$ assuming the wth bit of bit expression of j as $j_w$ and $\vec{k'}_{0,w}$ is $\vec{k'}_{0,w}=1-\vec{k}_{0,w}$ when $j_w=0$ and $\vec{k'}_{0,w}=\vec{k}_{0,w}$ when $j_w=1$;

a process of calculating $[[(\vec{f}_j)_u]]^{Z\_q} := \Sigma_{0 \leq t < u}[[(\vec{f}_j)_t]]^{Z\_q} + [[s_j]]^{Z\_q}$;

a process of calculating $[\sigma_{0-1}]^{Z\_q,01} := \Sigma_{0 \leq j < 2^L}[\vec{f}_j \vec{f}_j]^{Z\_q,01}$ through (2,2) output product sum operation; and a process of calculating $\langle \pi \sigma_0^{-1} \rangle^{20} := \{\pi\}^{01,12}[\sigma_0^{-1}]^{Z\_q,01}$, the first, second and third apparatuses perform:

a process of converting $\{\vec{k}_{i,0}\}^{Z\_2}, \{\vec{k}_{i,1}\}^{Z\_2}, \ldots, \{\vec{k}_{i,L-1}\}^{Z\_2}$ to (2,2) additive secret variance $[\vec{k}_{i,0}]^{Z\_2,01}, [\vec{k}_{i,1}]^{Z\_2,01}, \ldots, [\vec{k}_{i,L-1}]^{Z\_2,01}$ assuming $i=1, \ldots, N-1$;

a process of inversely applying $\{\sigma_{i-1}^{-1}\}$ to $[\vec{k}_{i,0}]^{Z\_2,01}, [\vec{k}_{i,1}]^{Z\_2,01}, \ldots, [\vec{k}_{i,L-1}]^{Z\_2,01}$ to obtain $[\vec{b}_0]^{Z\_2,20} := [\sigma_{i-1}\vec{k}_{i,0}]^{Z\_2,20}, [\vec{b}_1]^{Z\_2,20} := [\sigma_{i-1}\vec{k}_{i,1}]^{Z\_2,20}, \ldots, [\vec{b}_{L-1}]^{Z\_2,20} := [\sigma_{i-1}\vec{k}_{i,L-1}]^{Z\_2,20}$;

a process of converting $[\vec{b}_0]^{Z\_2,20}, [\vec{b}_1]^{Z\_2,20}, \ldots, [\vec{b}_{L-1}]^{Z\_2,20}$ to $[[\vec{b}_0]]^{Z\_q}, [[\vec{b}_1]]^{Z\_q}, \ldots, [[\vec{b}_{L-1}]]^{Z\_q}$ through mod 2 → mod q conversion;

a process of calculating $[[K_D]] := [[\Pi_{w \in D}\vec{k}_{0,w}]]^{Z\_q}$ for each set of a positive integer $\eta$ satisfying $\eta < \lceil \log L \rceil$ and D satisfying $D \subseteq Z_L$ and $2^\eta + 1 \leq |D| \leq \min(2^{\eta+1}, L)$;

a process of calculating $[[\vec{f}_j]]^{Z\_q} := \Pi_{j < L}[[\vec{k}'_{i,w}]]$ for each j where $j < 2^L$ assuming the wth bit of bit expression of j is $j_w$, $\vec{k}'_{i,w}$ is $\vec{k}'_{i,w} = 1 - \vec{k}_{i,w}$ when $j_w = 0$ and $\vec{k}'_{i,w} = \vec{k}_{i,w}$ when $j_w = 1$;

a process of calculating $[[(\vec{f}_j)_u]]^{Z\_q} := \Sigma_{0 \leq t < u}[[(\vec{f}_j)_t]]^{Z\_q} + [[s_j]]^{Z\_q}$;

a process of calculating $[\sigma'^{-1}]^{Z\_q,20} := \Sigma_{0 \leq j < 2^L}[\vec{f}_j \vec{f}_j]^{Z\_q,20}$ through (2,2) output product-sum operation;

a process of applying $\{\sigma_{i-1}^{-1}\}$ to $[\sigma^{-1}]^{Z\_q,20}$ to obtain $[\sigma^{-1}]^{Z\_q,01} := [\sigma_{i-1}^{-1}\sigma'^{-1}]^{Z\_q,01}$; and a process of calculating $\langle \pi \sigma_i^{-1} \rangle^{20} := \{\pi\}^{01,12}[\sigma^{-1}]^{Z\_q,01}$ on $i = 1, \ldots, N-1$, and a process of inversely substituting $[[\vec{v}]]$ with $\{\sigma^{-1}\}$ assuming that $\{\sigma^{-1}\} = (\langle \pi \sigma_{N-1}^{-1} \rangle^{20}, \{\pi\}^{01,12})$ and output $[[\sigma \vec{v}]]$, wherein the processes are performed while concealing original data $\vec{k}_{0,0}, \vec{k}_{0,1}, \ldots, \vec{k}_{0,L-1}; K_D; \Pi_{w \in D}\vec{k}_0; \vec{f}_j; \vec{k}'_{0,w}; (\vec{f}_j)_u; (\vec{f}_j); s_j; \vec{b}_0, \vec{b}_1, \ldots, \vec{b}_{L-1}; \vec{f}; \vec{k}'_{j,w}; (\vec{f}_j)_u; (\vec{f}_j)_t; \vec{v}; \sigma\vec{v}$ from each of the first, second, and third apparatuses.

* * * * *

UNITED STATES PATENT AND TRADEMARK OFFICE
CERTIFICATE OF CORRECTION

PATENT NO. : 11,461,395 B2
APPLICATION NO. : 16/652895
DATED : October 4, 2022
INVENTOR(S) : Dai Ikarashi et al.

It is certified that error appears in the above-identified patent and that said Letters Patent is hereby corrected as shown below:

In the Claims

In Claim 1, Column 12, Line 9, please change from "third" to -- Mth --.

In Claim 1, Column 12, Line 36, please change from "third" to -- Mth --.

In Claim 2, Column 12, Line 44, please change from "Mth" to -- third --.

Signed and Sealed this
Eleventh Day of April, 2023

Katherine Kelly Vidal
*Director of the United States Patent and Trademark Office*